Figure 1:
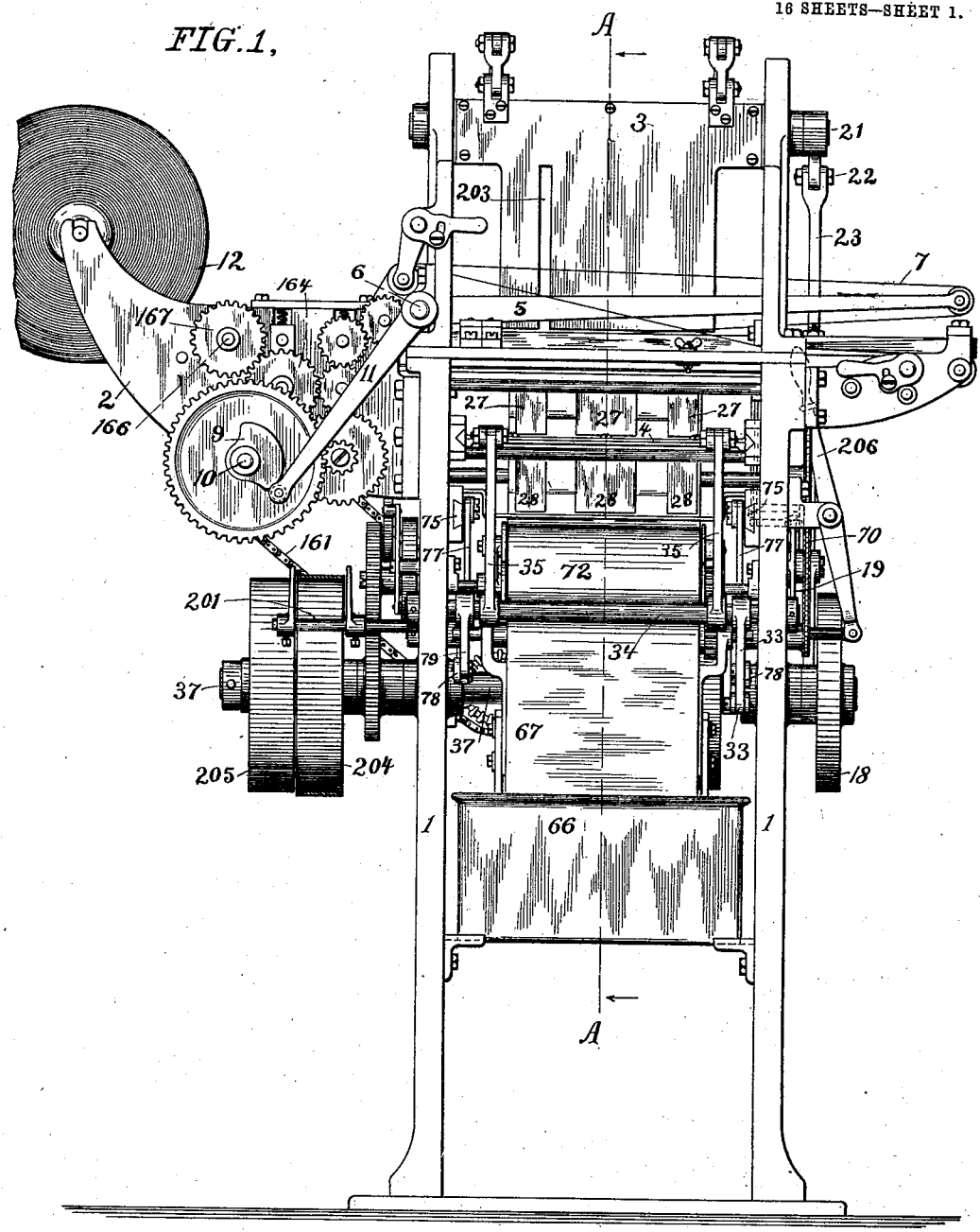

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 1.

WITNESSES:

INVENTOR

BY

ATTORNEYS

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 2.
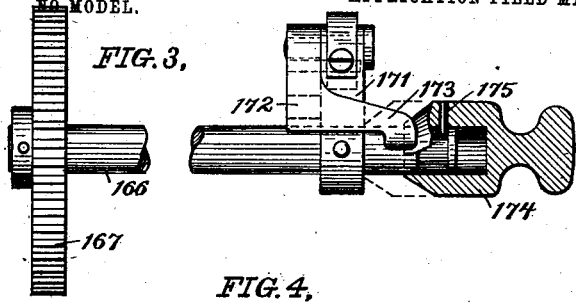
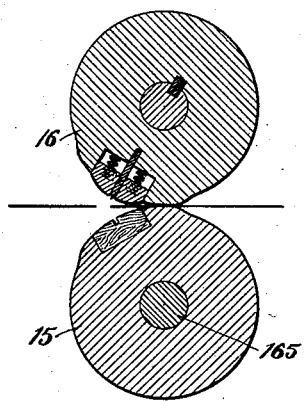
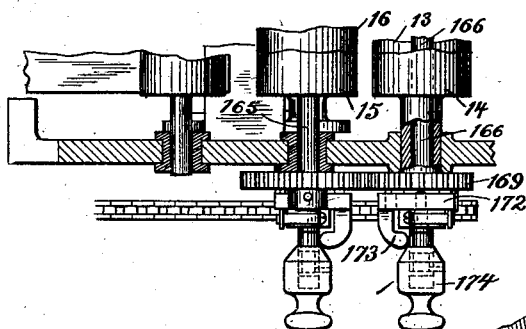
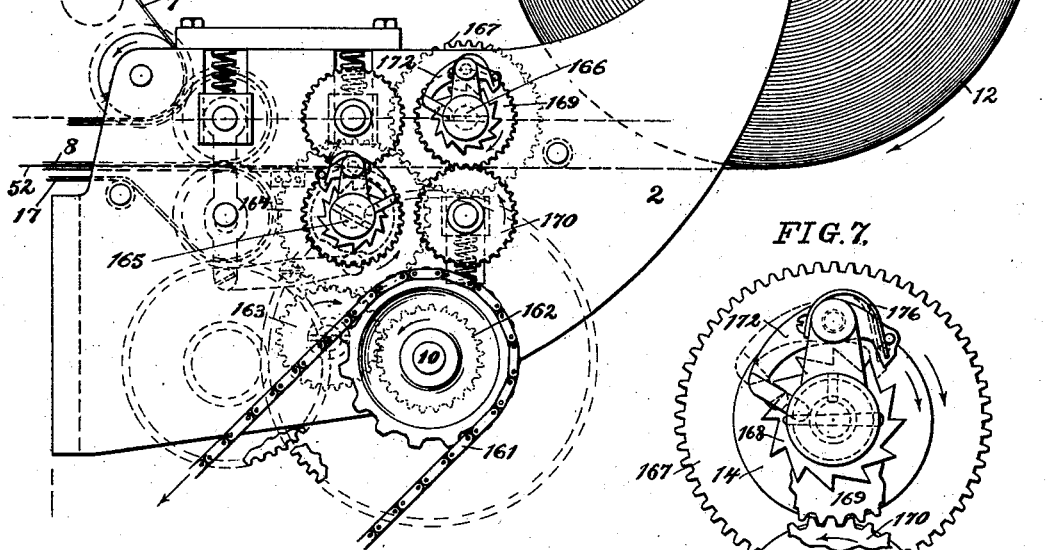
WITNESSES:
INVENTOR
BY
ATTORNEYS
THE NORRIS PETERS CO., PHOTO-LITHO., WASHINGTON, D. C.

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 5.

WITNESSES:

INVENTOR

BY

ATTORNEYS

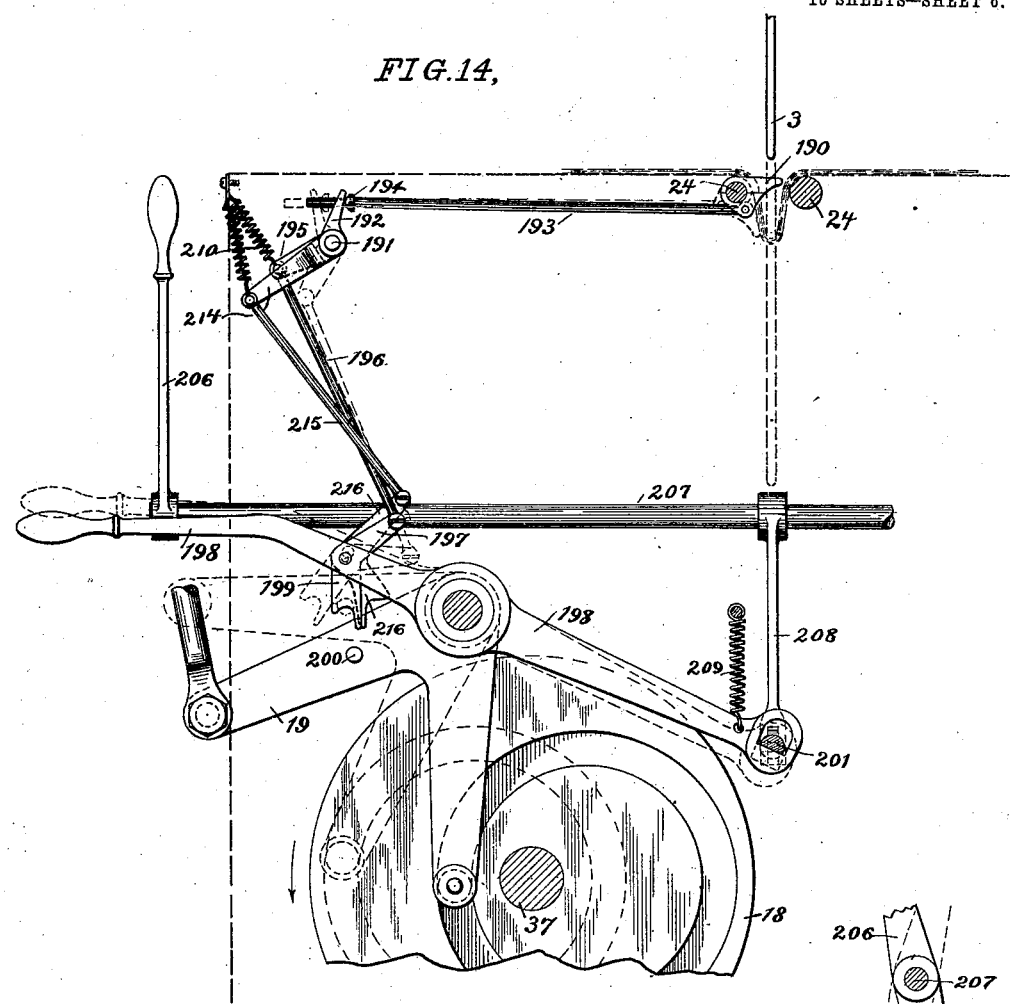

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 7.
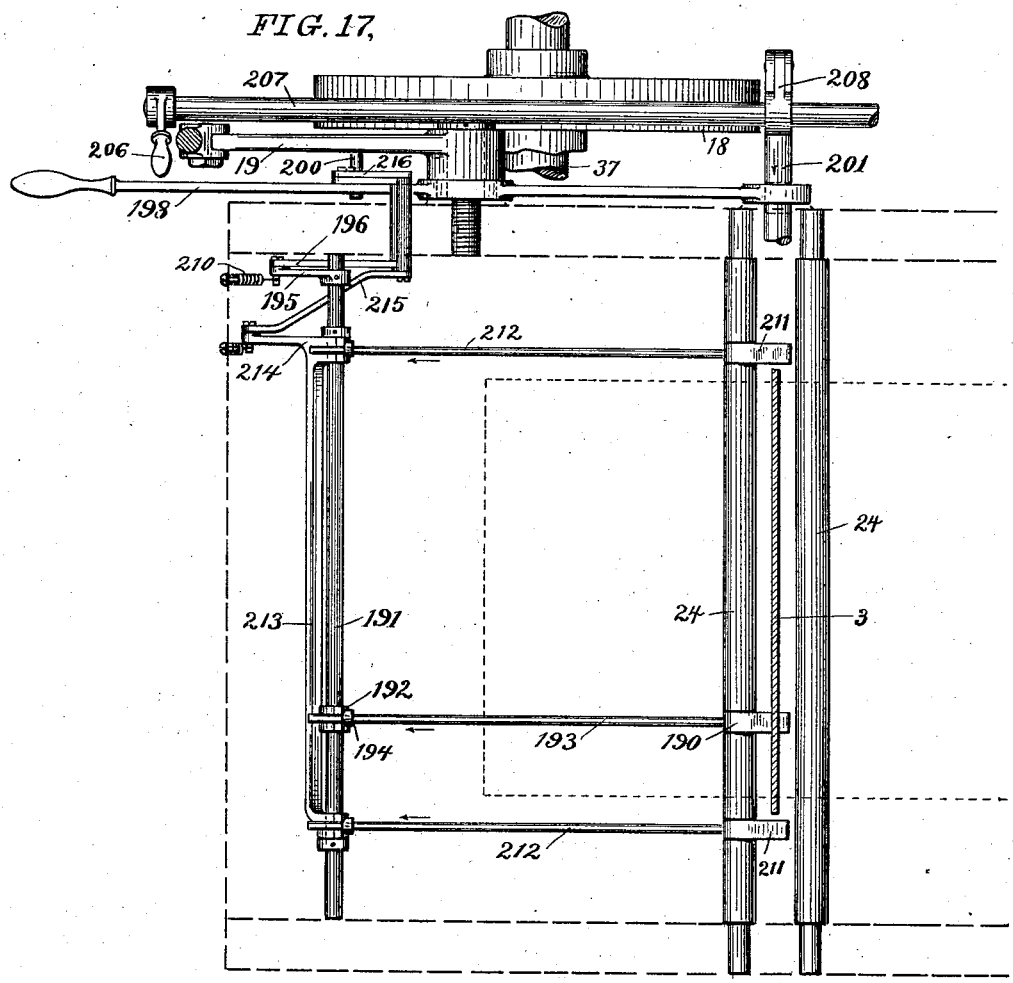
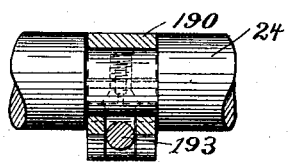
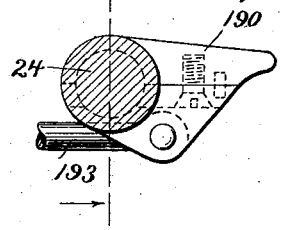
WITNESSES:
INVENTOR
BY
ATTORNEYS No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 8.

WITNESSES:
INVENTOR
BY
ATTORNEYS

No. 720,212. PATENTED FEB. 10, 1903.
L. A. AGNEW.
MACHINE FOR FOLDING, WRAPPING, ADDRESSING, AND ASSORTING
NEWSPAPERS OR THE LIKE.
APPLICATION FILED MAR. 30, 1900.

NO MODEL. 16 SHEETS—SHEET 9.

WITNESSES:

INVENTOR

BY

ATTORNEYS

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.

NO MODEL. 16 SHEETS—SHEET 10.

FIG. 27.
FIG. 25.
FIG. 26.
FIG. 28.

WITNESSES:
Leon Lake
A. H. Felix

INVENTOR
Leo A. Agnew
BY
E. M. Marble Jr.
ATTORNEYS

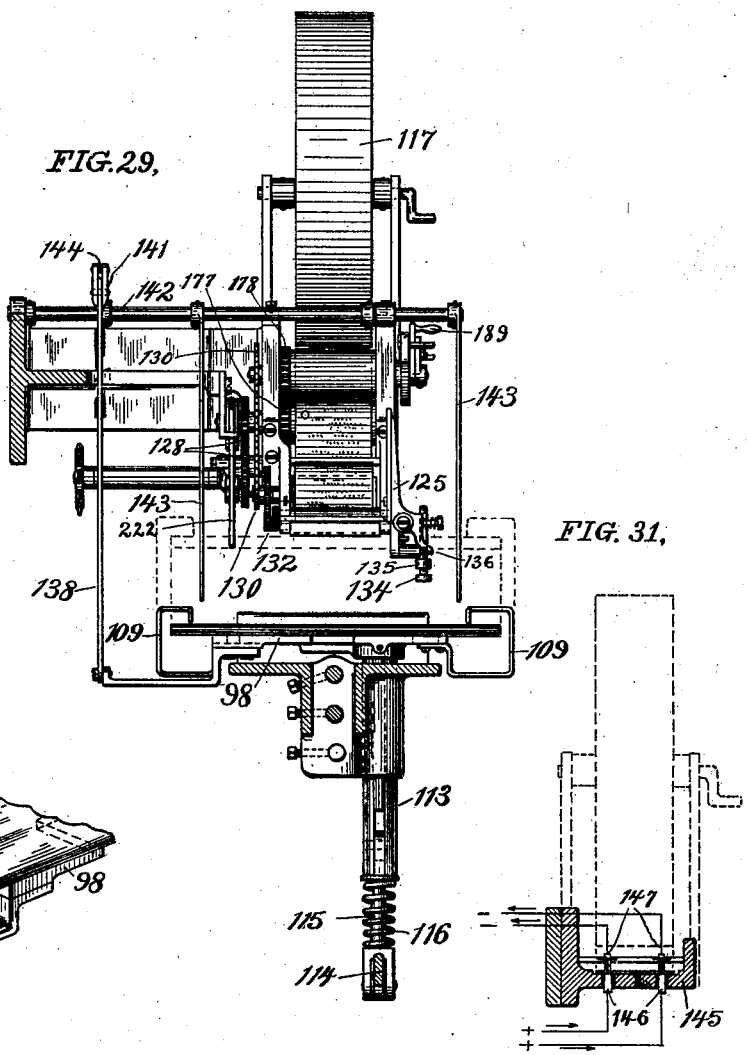

No. 720,212. PATENTED FEB. 10, 1903.
L. A. AGNEW.
MACHINE FOR FOLDING, WRAPPING, ADDRESSING, AND ASSORTING
NEWSPAPERS OR THE LIKE.
APPLICATION FILED MAR. 30, 1900.
NO MODEL. 16 SHEETS—SHEET 12.

WITNESSES:
INVENTOR
BY
ATTORNEYS

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 13.

WITNESSES: INVENTOR
BY
ATTORNEYS

No. 720,212. PATENTED FEB. 10, 1903.
L. A. AGNEW.
MACHINE FOR FOLDING, WRAPPING, ADDRESSING, AND ASSORTING NEWSPAPERS OR THE LIKE.
APPLICATION FILED MAR. 30, 1900.
NO MODEL. 16 SHEETS—SHEET 14.
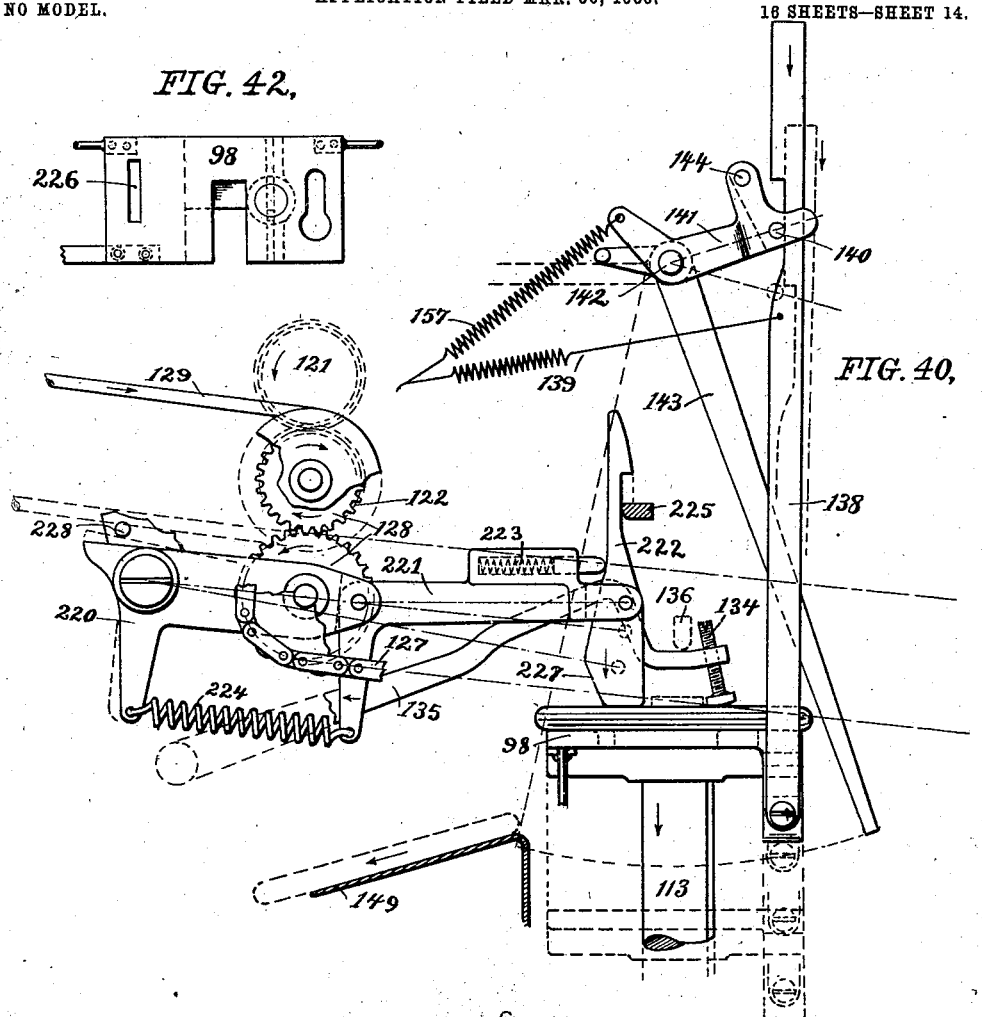
WITNESSES: INVENTOR
BY
ATTORNEYS

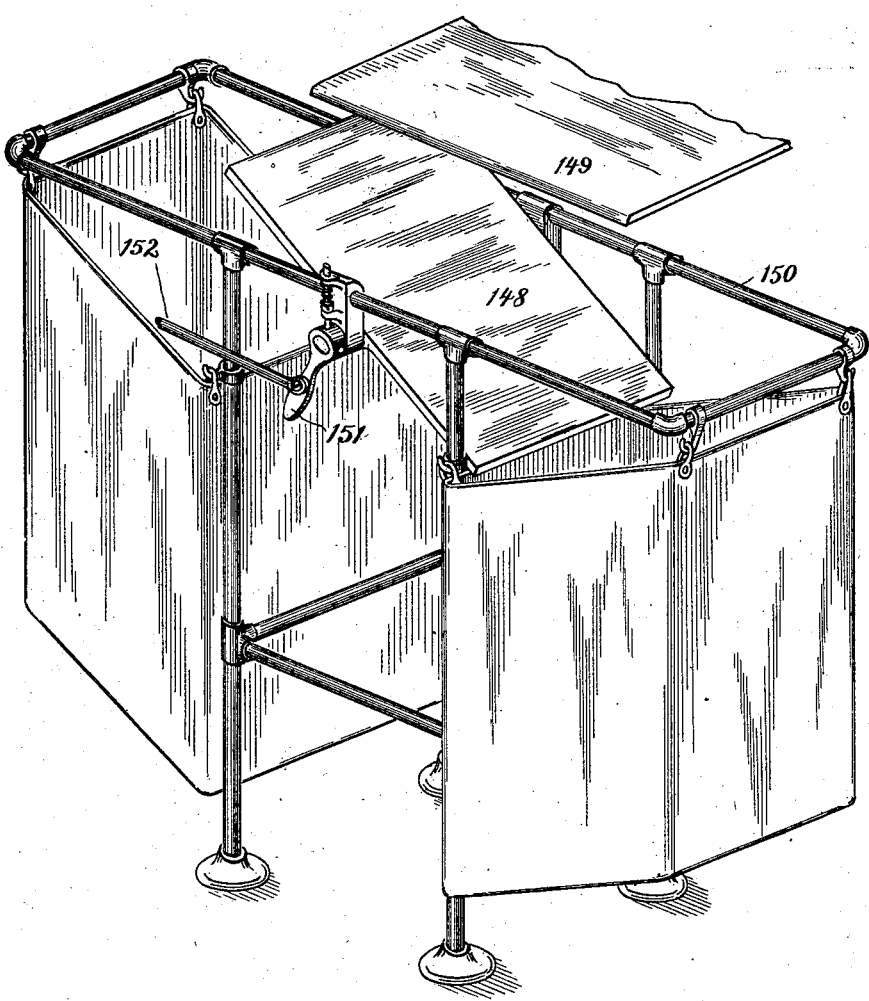

No. 720,212.
L. A. AGNEW.
PATENTED FEB. 10, 1903.

MACHINE FOR FOLDING, WRAPPING, ADDRESSING, AND ASSORTING NEWSPAPERS OR THE LIKE.

APPLICATION FILED MAR. 30, 1900.

NO MODEL.

16 SHEETS—SHEET 16.

WITNESSES:
Leon Lake
A. H. Estes

INVENTOR
Lee A. Agnew
BY
E. M. Marble & Son
ATTORNEYS

UNITED STATES PATENT OFFICE.

LEE A. AGNEW, OF NEW YORK, N. Y., ASSIGNOR, BY MESNE ASSIGNMENTS, TO AGNEW AUTO-MAILING MACHINE COMPANY, OF BOSTON, MASSACHUSETTS, A CORPORATION OF MAINE.

MACHINE FOR FOLDING, WRAPPING, ADDRESSING, AND ASSORTING NEWSPAPERS OR THE LIKE.

SPECIFICATION forming part of Letters Patent No. 720,212, dated February 10, 1903.

Application filed March 30, 1900. Serial No. 10,798. (No model.)

*To all whom it may concern:*

Be it known that I, LEE A. AGNEW, a citizen of the United States, residing at New York, in the county of New York and State of New York, have invented certain new and useful Improvements in Machines for Folding, Wrapping, Addressing, and Assorting Newspapers or the Like; and I do hereby declare the following to be a full, clear, and exact description of the invention, such as will enable others skilled in the art to which it appertains to make and use the same.

My invention relates to improvements in machines for folding, wrapping, addressing, and assorting newspapers, magazines, and the like, and embodies improvements upon the machine shown in my Patents No. 591,801, dated October 19, 1897, and No. 586,327, dated July 13, 1897, and shown in my applications Serial No. 688,910, filed August 18, 1898, and Serial No. 710,057, filed March 22, 1899.

The objects of my invention are to improve the construction and operation of machines for folding, wrapping, addressing, and assorting newspapers and the like, to render such machines more effective and certain in their operation, to enable such machines to employ wrappers already addressed or to address wrappers at the will of the user, and to make the machine as simple, compact, and inexpensive as possible. These objects are attained in the invention herein described, and illustrated in the drawings which accompany and form a part of this specification, in which the same reference-numerals indicate the same or corresponding parts, and in which—

Figure 8:
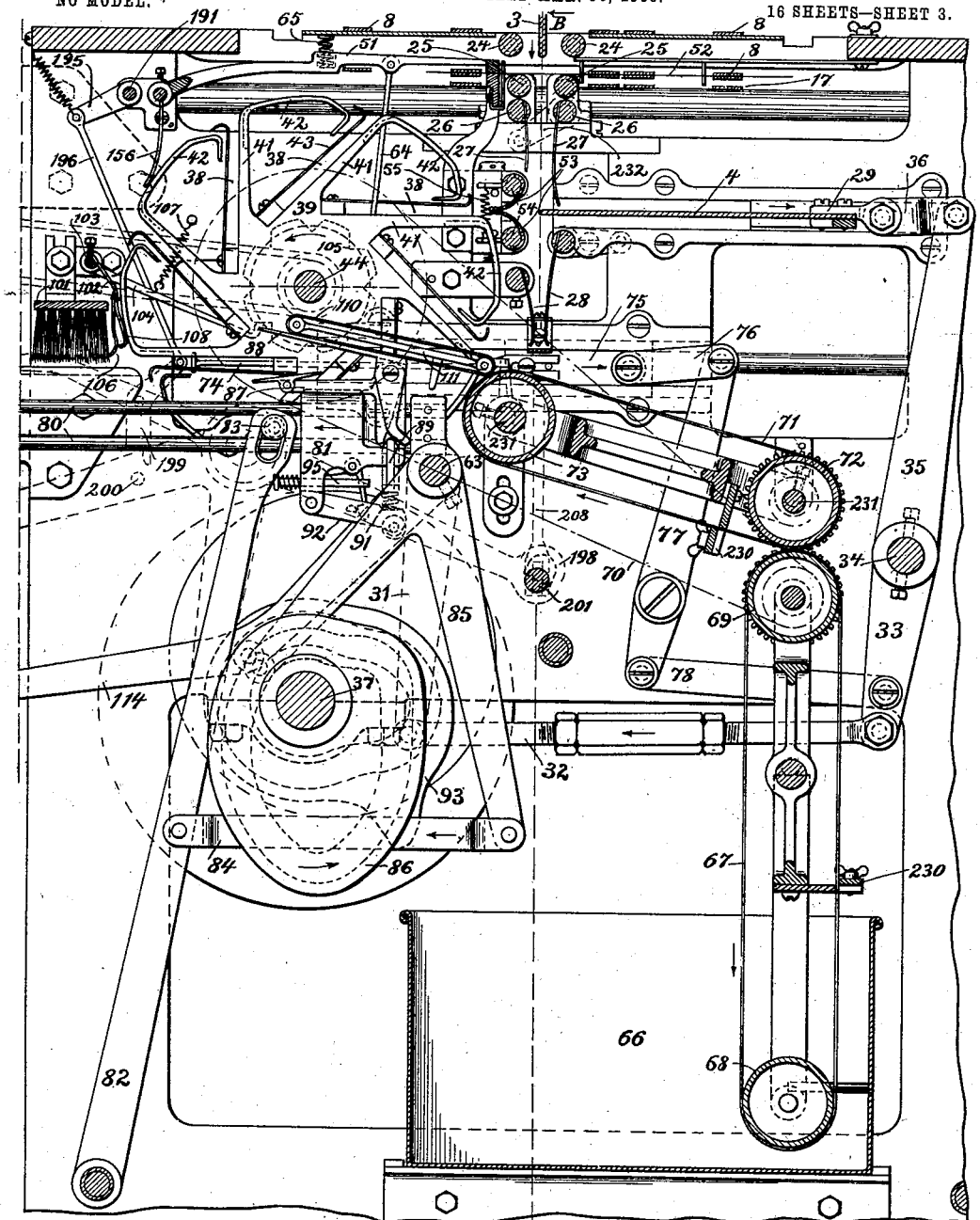
Figure 9:
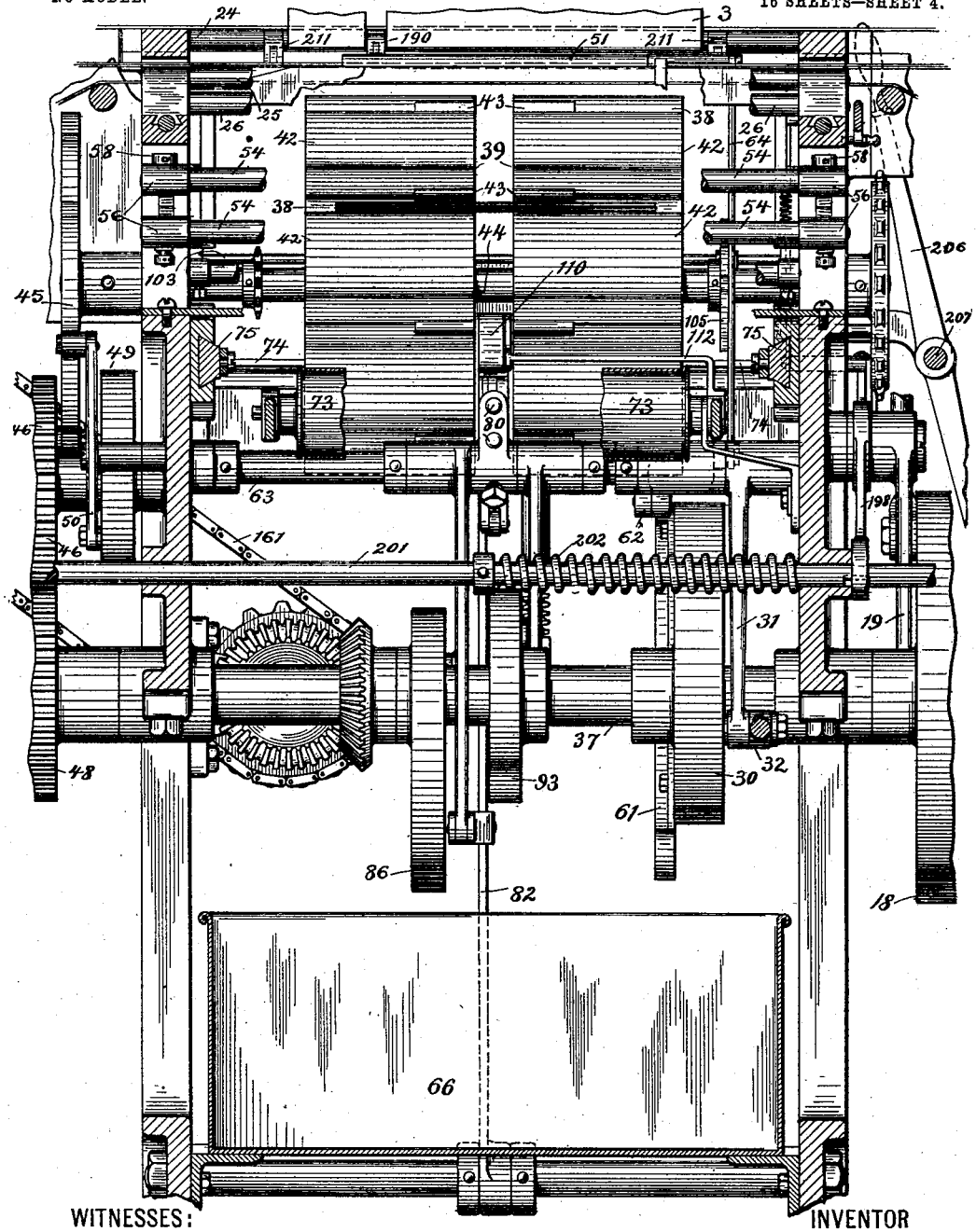
Figure 10:
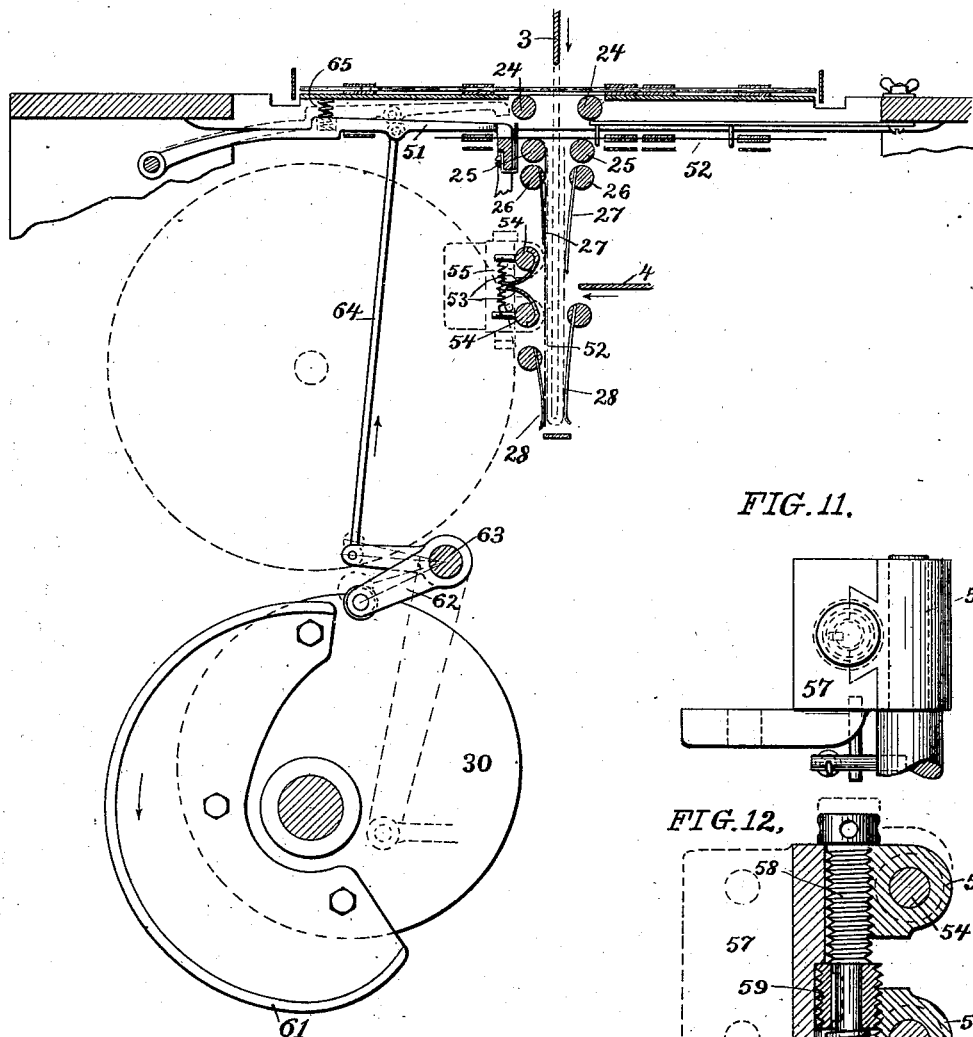
Figure 11:
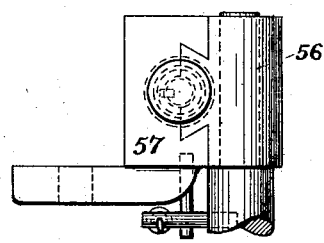
Figure 12:
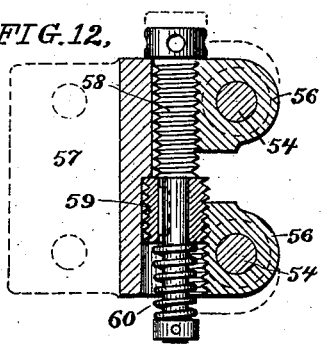
Figure 13:
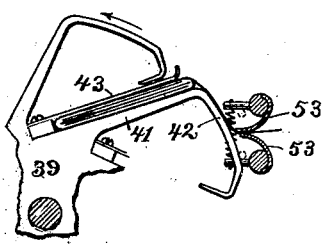
Figure 20:
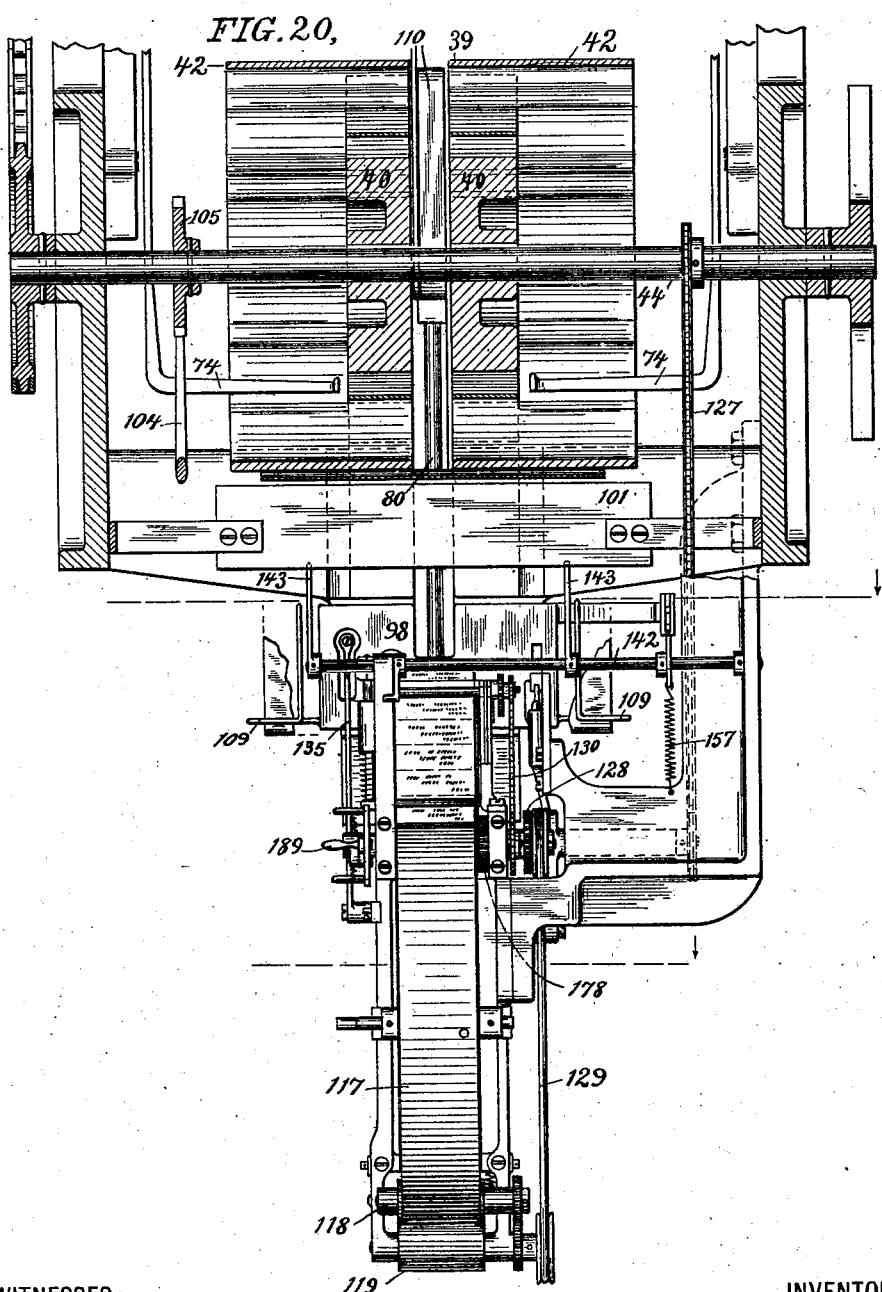
Figure 33:
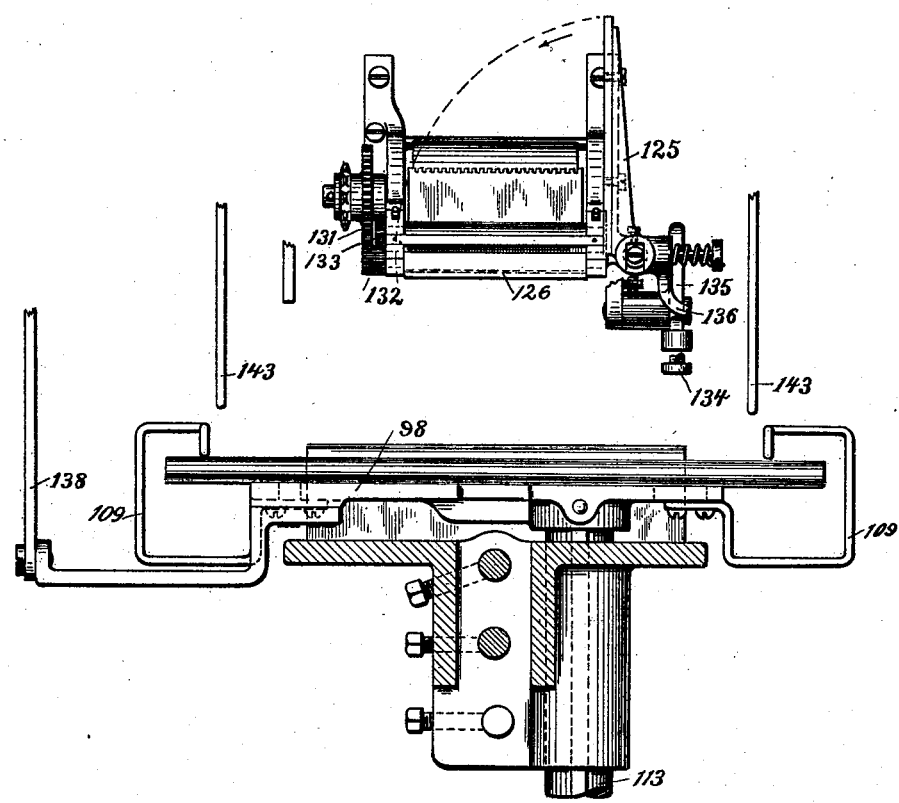
Figure 34:
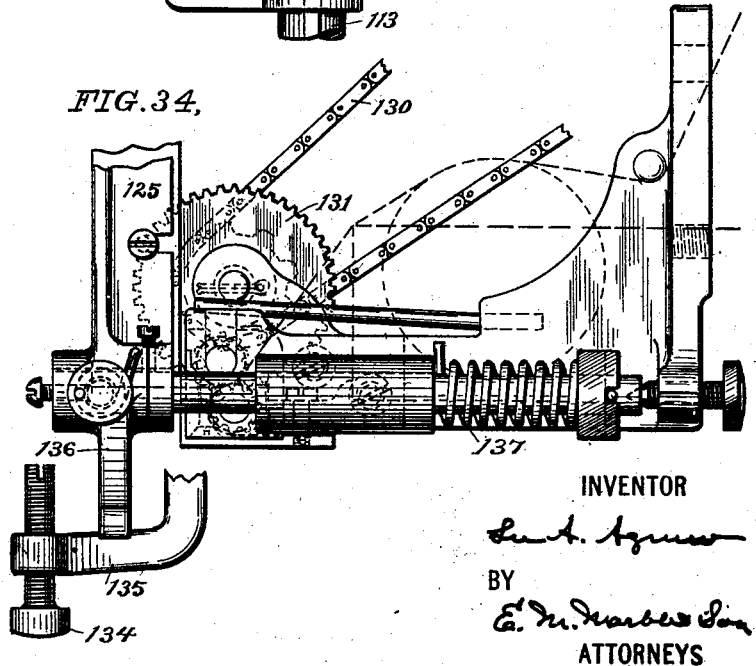
Figure 37:
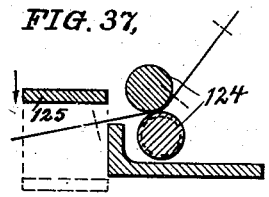
Figure 38:
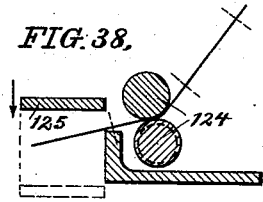
Figure 35:
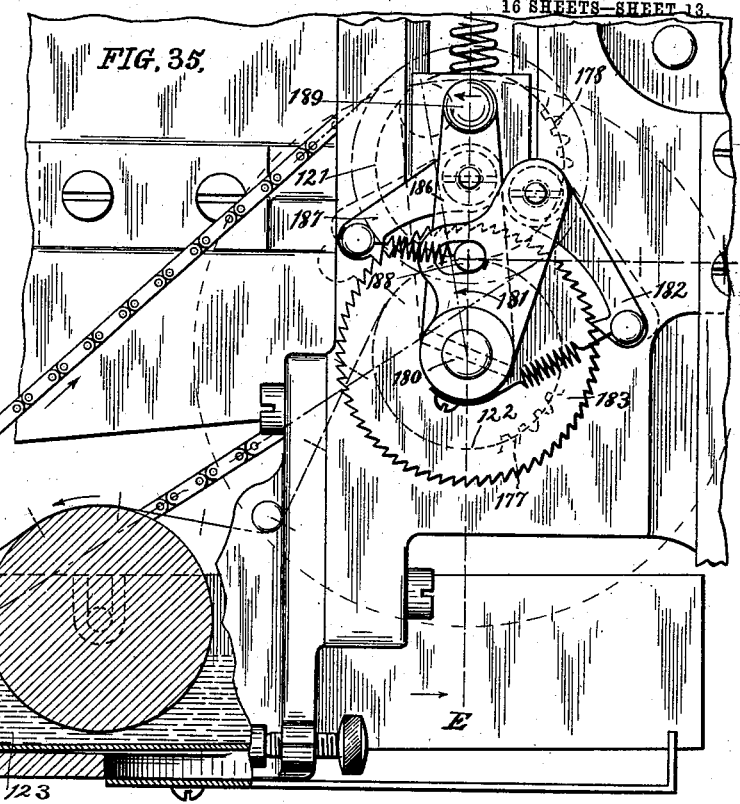
Figure 36:
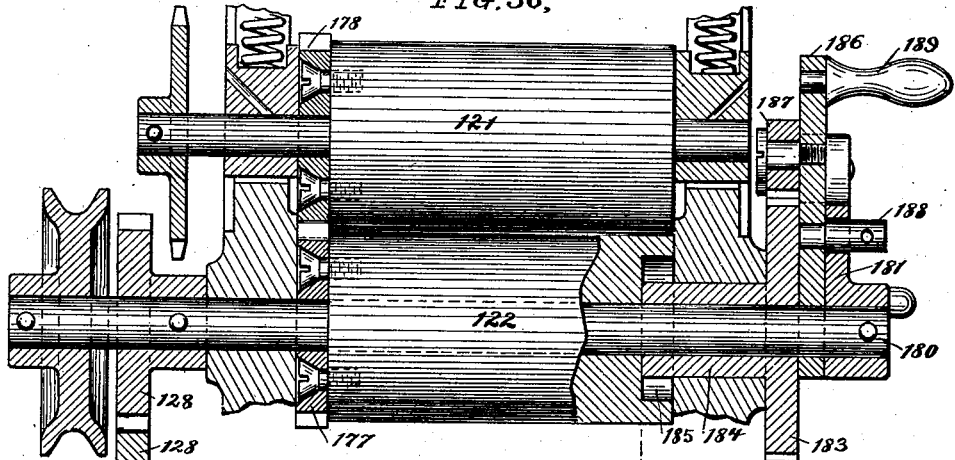
Figure 39:
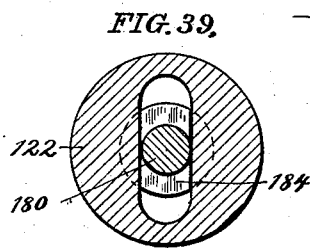
Figure 44:
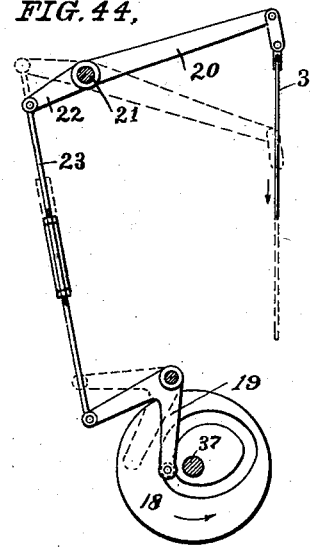
Figure 45:
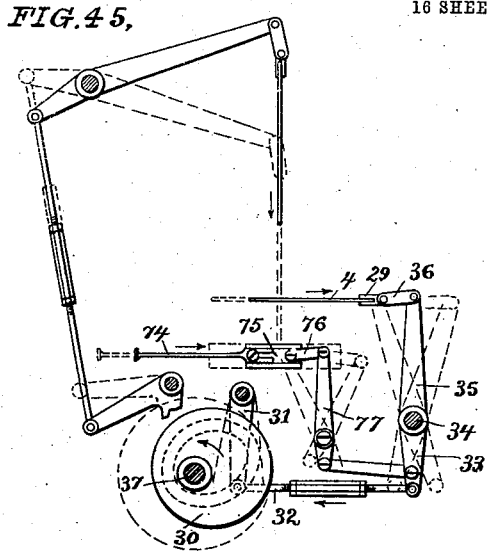
Figure 46:
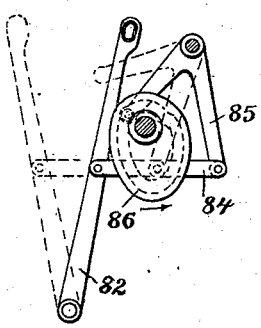
Figure 47:
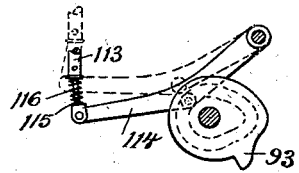

Figure 1 is a side elevation of the machine. Figs. 2 to 7, inclusive, relate to the wrapper-feeding mechanism. Of these figures Fig. 2 is a detail side elevation taken from the side of the machine opposite that shown in Fig. 1 of the mechanism for feeding and cutting the wrapper-strip. Fig. 3 is a detail side elevation of one of the escapement mechanisms for adjusting the point at which the wrapper is cut. Fig. 4 is a detail top view showing the two escapement mechanisms of the wrapper feeding and cutting mechanism. Fig. 5 is a detail cross-section of the two cutting-rolls. Fig. 6 is a side view of one of the feeding-rolls; and Fig. 7 is an end view, on a larger scale than that of Fig. 2, of one of the escapement mechanisms. Fig. 8 is a central transverse section of the principal portion of the machine, showing the folding and wrapping devices. The section is taken on the line A A of Fig. 1. Fig. 9 is a longitudinal section of the principal portion of the machine on the section-line B B of Fig. 8. Fig. 10 is a detail side view of the mechanism employed for holding one edge of the wrapper while the primary folding-knife is operating. This side view also shows the retarding-springs which keep the wrapper tight while the folded paper is being thrust into a pocket of a revolving carrier or "basket." Figs. 11 and 12 are detail views showing the means employed for adjusting the distance between these springs both automatically and by hand, Fig. 11 being a top view and Fig. 12 being a vertical section through the center line of the adjusting-screw. Fig. 13 is a detail view showing a portion of the carrier and the spring retarding-fingers and illustrates how the said retarding-fingers draw the wrapper tight as the basket moves on. Fig. 14 is a detail side view of the stop-motion mechanism for arresting the operation of the machine when no papers are fed underneath the primary folding-knife or when a paper is fed too far to one side. Fig. 15 is a detail view taken at right angles to Fig. 14, showing the belt-shifting rod and means for moving the same. Fig. 16 is a detail view, on a smaller scale, showing the mechanism employed for revolving the basket intermittently. Fig. 17 is a detail top view of the stop-motion mechanism shown in Figs. 14 and 15. Fig. 18 is a side elevation of one of the detector-fingers thereof; and Fig. 19 is a cross-section of one of such fingers, showing the connection of the operating-rod thereto. Fig. 20 shows a top view of the addressing mechanism and a central horizontal section of the basket and the parts in proximity thereto. Fig. 21 is a side view of the addressing mechanism and of the assorting mechanism employed for depositing the papers in pockets or receptacles. Fig. 22 is a diagrammatic view showing the action of the electrical device for shifting the deflecting-table of the assorting mechanism. Fig. 23 is a top view of a portion of the address-strip and the contact-fingers that rest upon the same. Fig. 24 shows a top view and also an edge view of a portion of an address-strip which is provided at intervals with perforations and with pieces of tin foil or other suitable conducting material backing such perforations and serving to prevent paste from reaching the back of the address-strip. Fig. 25 is a detail side view of the clamping mechanism for holding the wrapper about the folded paper while the same is being ejected from the carrier. This figure shows the clamping mechanism about to grasp a paper. Fig. 26 is a similar view of this clamping mechanism, showing it as it releases the paper and starts to move backward. Fig. 27 is a transverse section of this clamping mechanism on the section-line C C of Fig. 25. Fig. 28 is a transverse section of this clamping mechanism on the line D of Fig. 26. Fig. 29 is an end view of the addressing mechanism detached from the rest of the machine. Fig. 30 is a detail perspective view of a portion of an elevator-table by which the folded papers delivered from the basket are carried upward to the addressing mechanism. Fig. 31 is a detail cross-section of the address-strip and the table supporting the insulated contact pieces and brushes by which the circuits of the assorting mechanism are operated. Fig. 32 is a detail side view of two rollers at the delivery end of the addresser and between which the address-strip passes. Fig. 33 is a detail front view of the paper-elevating table and of the front end of the addresser, showing how the cutting-knife of the addresser is operated. Fig. 34 is a side view, on a larger scale than Fig. 33, showing the cutting-knife and parts of the addresser directly connected or associated therewith. Fig. 35 is a side view of a portion of the addresser, showing particularly the escapement mechanism employed for adjustment of the address-strip. Fig. 36 is a side view of the main feeding-rolls of the addressing mechanism and a central section, on the line E of Fig. 35, of the escapement mechanism thereof. Figs. 37 and 38 are similar detail sectional views showing how by the operation of the escapement mechanism shown in Fig. 35 the address-strip may be adjusted. Fig. 39 is a detail transverse section of the lower feed-roll of the addresser, taken on the line F of Fig. 36. Fig. 40 is a detail side view of the mechanism employed for preventing the operation of the addresser in case no papers are fed upward thereto and for ejecting the papers from the table by which they are carried upward to the addresser. Fig. 41 is a similar view of a portion of the mechanism shown in Fig. 40, showing how the operation of the addressing mechanism is prevented when no papers are fed upward thereto. Fig. 42 is a top view of the table by which the papers are carried upward to the addressing mechanism. Fig. 43 is a perspective elevation of the assorting mechanism for depositing the addressed papers in receptacles in accordance with their destinations. Figs. 44 to 47, inclusive, are diagrammatic views showing various cam mechanisms of the machine, Fig. 44 showing the mechanism for vibrating the primary folding-knife, Fig. 45 showing the mechanism for vibrating the secondary folding-knife and the ejecting-fingers 74, Fig. 46 showing the mechanism for vibrating the clamp-carriage 81, and Fig. 47 showing the mechanism for vibrating the plunger.

In the drawings, 1 is the frame of the machine; 2 2, the brackets supporting the wrapper-roll; 3, a primary folding-knife; 4, a secondary folding-knife; 5, one of the series of arms keyed to a shaft 6 and carrying feed-tapes 7, by which, in conjunction with the feed-tapes 8, beneath them, (shown in Fig. 8,) the papers may be fed under the folding-knife 3. Said arms 5 are raised at intervals to permit the insertion of papers between the tapes 7 and 8 by a cam 9, mounted on a shaft 10 and acting upon a lever 11, likewise keyed to the shaft 6. The papers may be inserted between the tapes 7 and 8 by hand or by vibrating needles taking paper from the shelves of an elevator, as shown in my Patent No. 586,327, or by any other suitable means.

As in the machine of my Patent No. 586,327, while a paper to be folded and wrapped is fed to a position under the primary folding-knife by the feed-tapes a section of the wrapper-web is drawn from a roll of wrapping material and is cut off and fed under the paper to be folded.

12 in the accompanying drawings is a roll of wrapping-paper. In my said patent two rolls are employed for both feeding and cutting the wrapper; but in this machine, for reasons to be explained hereinafter, I have employed two rolls, numbered 13 and 14, respectively, for drawing the wrapper from the roll 12, and two other rolls, numbered 15 and 16, respectively, for cutting the wrapper into suitable lengths. The said feeding and cutting rolls are rotated by means hereinafter described. The sections of the wrapper as cut off are carried away by rapidly-moving tapes 8 and 17, as shown in Fig. 2, and are thereby brought into position beneath the primary folding-knife and the paper to be folded, the latter having already been brought into position by the tapes 7 and 8, as above described. The upper sides of the tapes 8 act to feed the paper and the lower sides of said tapes to feed the wrapper.

The primary folding-knife is operated by a cam 18 and connecting mechanism shown in Fig. 44 and consisting of a follower-lever 19, rocker-arms 20, a rock-shaft 21, having an arm 22 thereon, and a link 23, connecting the arm 22 and the follower-lever 19.

When the paper to be folded and its wrapper have been brought into position beneath the primary folding-knife, as above described, said folding-knife then descends, folding the papers between guide-rollers 24 24 25 25 26 26, (the last of which carry guide-fingers 27 27,) and so on into a pocket formed by spring-fingers 28 28, Figs. 8 and 10. In this position the paper thus partly folded is directly in front of the secondary folding-knife 4, which is secured to a cross-head 29, mounted in suitable guides in the frame of the machine, and is reciprocated by cam 30, (not shown in Fig. 8, but shown in Figs. 9 and 45,) having a follower-lever 31, connected by a link 32 to an arm 33 on a rock-shaft 34. Arms 35 on this rock-shaft are connected by a link 36 to the cross-head 29 of the secondary folding-knife.

The cams 18 and 30, above mentioned, are mounted upon the main drive-shaft 37 of the machine.

The secondary folding-knife when it moves forward folds the paper a second time and pushes it and the wrapper about it into one of a series of pockets 38 in a revolving carrier 39. (Shown particularly in Figs. 8, 9, and 20.) This carrier 39 is formed of two sections, each consisting of a hub 40, Fig. 20, from which projects arms 41, having at their ends broad tables or pallets 42. Springs 43, secured to the arms 41, complete the pockets. The sections of the carrier 39 are separated by a narrow slot, within which work the members of a clamp forming a part of the ejecting mechanism, as hereinafter described, and within the space inclosed by the overhanging tables or pallets 42 work the ejectors hereinafter mentioned.

The carrier 39 is mounted upon a shaft 44, which shaft is rotated by a common form of intermittent drive mechanism, (shown in detail in Fig. 16,) consisting of a toothed disk 45, keyed to the shaft 44, a gear 46, carrying a pin 47, adapted to engage the wheel 45 during each revolution of the gear 46, and so to advance the disk 45 through the space of one tooth each time the gear 46 rotates, and a gear 48, mounted upon the driving-shaft 37 of the machine and intermeshing with gear 46. A cam 49, Fig. 9, the cam-slot of which is shown in outline in Fig. 16, operates a stop-lever 50, which holds the disk 45 stationary except at times when it is being rotated by the pin 47.

In former folding and wrapping machines it has been customary to cause one end of the wrapper to be inserted into one of the folds of the paper, so as to hold that end of the wrapper stationary while the wrapper is being drawn tight and while its other end is being pasted down upon the body of the wrapper. The insertion of a portion of the wrapper into the fold of the paper necessitates the use of a somewhat longer section of wrapping-paper than would be necessary if the wrapper simply inclosed the paper. To avoid waste of wrapping-paper in this manner, I have provided a clamping-arm 51, Figs. 8 and 10, which grasps one edge of the wrapper just before the primary folding-knife 3 descends. As shown in Fig. 10, when the folding-knife 3 descends the wrapper (designated in that figure by the numeral 52) is drawn down into the position shown by the heavy broken line and does not then inclose the paper. As the secondary folding-knife 4 operates and the paper is deposited in one of the pockets of the carrier 39 the clamping-arm 51 is raised by means hereinafter described, thus leaving the wrapper free to enter the carrier. The paper, with the wrapper about it, in passing into the carrier passes between two spring-fingers 53 53, which press the folds of the paper together and as the carrier revolves draw the wrapper tight, as shown in Fig. 13, and press its projecting flap against one of the tables or pallets 42 of the carrier.

The shafts 54 54, to which the springs 53 are connected, are revolubly mounted and are connected by a spring 55, which tends to hold the springs 53 together. Said shafts are mounted in blocks 56, Figs. 11 and 12, arranged to slide in channels of brackets 57, secured to the frame of the machine, and the distance between them may be adjusted by means of the screws 58, the threads of which engage the upper blocks 56, while threaded bushings 59, mounted upon and connected to screws 58 by splines, engage the lower blocks 56 and are normally pressed upward by spring 60. These springs 60 permit the shafts 54 to separate in case the paper folded is unusually thick.

The clamping-arm 51 is operated by a cam 61, secured to one side of the cam 30 and adapted to engage and operate a follower-lever 62, mounted on a rock-shaft 63 and connected by a link 64 with said clamping-arm 51. A spring 65 tends to hold said clamping-arm down, and the cam 61, when it operates, raises arm 51 against the action of the spring.

The main purpose of the tables or pallets 42 of the carrier 39 is to apply paste to the projecting flaps of the wrappers.

The reference-numeral 66, Fig. 8, designates the paste-receptacle. The paste is carried therefrom by a belt 67, passing over rollers 68 and 69, the latter of which is driven by a sprocket chain or rope 70 (indicated in dotted lines in Fig. 8) and is transferred from belt 67 to a similar belt 71, passing over rolls 72 and 73. Belt 71 touches each pallet 42 of the carrier 39 as said carrier rotates, and thereby spreads paste over the pallet.

When the carrier 39 in its intermittent rotation has carried a paper to a point opposite to that at which such paper is deposited in the carrier, an ejecting mechanism operates to eject said paper from the carrier. 74 74, Figs. 8, 9, 20, and 45, are the ejecting-fingers of this mechanism. They project into the space inclosed by the overhanging ends of the carrier 39 and are carried by slides 75, Figs. 1, 8, 9, and 45, mounted in suitable guides in the frame of the machine. These slides are reciprocated by links 76 and rocker-arms 77, one of which is connected by a link 78 to the arm 33, forming a part of the mechanism for reciprocating the secondary folding-knife 4, and the other by another link 78 to a similar arm 79, Fig. 1, mounted upon the same rock-shaft with arm 33. When the secondary folding-blade moves forward, therefore, the ejecting-fingers 74 will also move forward.

In order to hold the paper tightly compressed and to hold the wrapper firmly about it while the paper is being ejected from the carrier, I provide a traveling clamping mechanism. (Shown particularly in Figs. 8 and 25 to 28, inclusive.)

80 80 are two guide-rods, upon which is mounted a carriage 81. This carriage is reciprocated back and forth along the guides by a mechanism shown particularly in Fig. 46 and consisting of a pivoted arm 82, having a slot in which works the pin 83, carried by the carriage 81 and connected by a link 84 with a bell-crank 85, the other arm of which carries a pin working in a cam-groove of a cam 86, mounted upon the main shaft 37 of the machine. The carriage 81 carries two clamping-fingers 87 and 88, both of which are in form bell-crank levers, the lower extensions or arms of such levers being adapted to be engaged by an upwardly-movable pin 89. A spring 90 (shown in Fig. 27 and indicated in dotted lines in Figs. 25 and 26) tends to hold this pin downward. Beneath the pin is a cushion-spring 91, and beneath said cushion-spring is an arm 92, pivoted to the carriage 81. A cam 93 on the shaft 37 has a projection adapted to engage a friction-roller 94 at the end of this arm 92 and lift said arm just after the carriage has commenced its forward movement, thus raising the pin 89 and forcing the clamping-fingers 87 and 88 together. When the arm 92 is so raised, a latch 95, carried by the carriage 81, engages a projection 96 on said arm and holds the same elevated, thus holding the clamping-fingers together. As shown particularly in Figs. 9 and 20, the guides 80 of this clamping mechanism are located in a slot between the two sections of the carrier 39, and the clamping mechanism is adapted to work back and forth within said slot. The cams 86 and 93 are so formed that the clamping-fingers 87 and 88 move forward and grasp the paper to be folded just before the ejecting-fingers 74 begin to push said paper from the pocket of the carrier, and they keep pace with the ejecting-fingers in their movement. Obviously the ejecting-fingers 74 might be omitted and the vibrating clamping mechanism alone employed for ejecting the papers; but I prefer to use both the vibrating clamping mechanism and the ejecting-fingers, the clamping mechanism working at the center of the folded paper and the ejecting-fingers working near the ends thereof. The lower clamp-finger 87 is provided with a hinged contact-piece 97, which adjusts itself automatically to papers of different thicknesses.

The clamping mechanism and the ejecting-fingers together carry the folded and wrapped paper to a vertically-movable table 98, after which both the ejecting-fingers and the clamping mechanism retire. As the carriage 81 approaches the outer limit of its travel a spring-pressed pin 99, carried thereby, encounters a stationary stud 100, Fig. 26, and is pressed backward thereby. The latch 95 passes through a slot in said pin, and when the latter is so pressed back the latch is disengaged from the arm 92 and said arm is permitted to drop, thereby leaving the clamping-fingers 87 and 88 free to open and release the paper.

As the folded and wrapped paper is ejected from the carrier 39 in the manner above described the flap of its wrapper, which has been lying on one of the tables 42 of the carrier and has received paste from said table, is pressed down upon the body of the wrapper by a brush 101 and by the teeth 106 of a metal comb 102, which comb is secured to a shaft 103, provided with an arm 104, which engages the teeth of a cam-wheel 105. (Shown in dotted lines in Fig. 8 and shown also in Fig. 9.) This cam-wheel moves the arm 104 as the papers are successively ejected from the carrier in such a manner as to hold the teeth 108 away from the carrier except when the pallet 42, opposite said teeth, is covered by a wrapper. The arm 104 is provided with a spring 107, which holds it against said cam-wheel.

It is obvious that the brush 101 need not be employed and that the comb 102 may be relied upon to press the pasted flap of the wrapper down upon the body of the paper.

When the pasted flap of the wrapper is pressed down upon the body of the wrapper, as above described, the upper clamping-finger 88 is inclosed between the pasted flap of wrapper and the main portion thereof. The paste sets immediately, so as to hold the wrapper about the paper and to hold the paper folded; but when the carriage 81 retires said finger 88 is withdrawn from beneath the wrapper without difficulty, the paper being prevented from following the finger 88 by the ejecting-fingers 74 or, if the ejecting-fingers are not used, by spring-clamps 109 on the table 98. (See Figs. 29 and 30.) In order to apply the paste to all portions of the flap of the wrapper, including that portion which is opposite the slot between the sections of the carrier 39, I may employ a narrow paste-belt 110, Figs. 8 and 9, mounted upon a pivoted arm 111, hung to one end from a bracket 112, Fig. 9. At the other end the paste-belt 110 and arm 111 rest upon the clamping-finger 88. The belt 110 receives its paste from the paste-belt 71 and transfers the same to the upper surface of the finger 88, which finger when the upper flap of the wrapper is pressed down upon it transfers the paste to the said flap.

The table 98, above mentioned, is employed to raise the folded and wrapped papers after the same have been ejected from the carrier, as above described, to an addressing mechanism. For this purpose the table is mounted upon a vertically-movable plunger 113, Figs. 21, 29, and 33. The plunger 113 is arranged to be moved upward by a lever 114, actuated by the cam 93, above mentioned, as shown in Fig. 47. This lever is connected to the plunger 113 by a rod 115, which has a sliding connection with the plunger and between which and the plunger is a cushion-spring 116. After a paper has been deposited upon the table 98 the cam 93 operates to raise said table, and thereby bring the paper into the range of action of the addresser. (Shown in Figs. 20, 21, and 29 and more particularly in Figs. 33 to 41, inclusive.) Referring now to these figures, 117 is a roll of paper upon which have been printed the several addresses. The paper as it is drawn from this roll passes between feeding-rollers 118 and 119, Fig. 20, and thence after forming a loop over a guide 120, Fig. 21, and thence between two feeding-rolls 121 and 122. (Shown in dotted lines in Fig. 21 and shown on a larger scale in Figs. 35 and 36.) From thence it passes over a paste-roller running in a paste-pot 123 and between feed-rollers 124, Fig. 35, and thence between cutting-blades 125 and 126, of which 125 is movable and 126 is stationary. Of these various feed-rollers that numbered 122 is driven from the shaft 44 of the carrier 39 by a sprocket-chain 127, Figs. 20 and 21, and gears 128, Fig. 36, and the roll 121 is driven from roll 122 by gear-wheels 178 and 177, directly connected to rolls 121 and 122. Mechanism shown in Figs. 40 and 41 is arranged to throw gears 128 out of mesh under certain conditions hereinafter mentioned.

Feed-roller 119 is driven from the upper gear 128 by a cord 129, Figs. 20 and 40, and roller 118 is driven from roller 119 by suitable gearing. Feed-rollers 124 are driven from roller 121 by means of a sprocket-chain 130, a gear-wheel 131, and a pinion 132, Figs. 32 and 33, connected to the lower roll 124. A pinion 133, intermeshing with pinion 132, drives the upper roll 124.

When a paper on the table 98 is raised by the upward movement of said table, it comes in contact with the head of an adjusting-screw 134, carried by a pivoted arm 135. Directly above this arm 135 is a tailpiece 136 integral with the cutting-knife 125, already mentioned. This cutting-knife is normally held in the elevated position shown in Fig. 33 by a spiral spring 137, Fig. 34; but when the tailpiece 136 is raised by the arm 135 during the upward movement of the latter the cutting-knife 125 is thrown downward, cutting off the advanced section of the address-strip and by means of its flat under side pressing said address-strip down upon the paper, and so affixing the same. The table 98 then descends, permitting the spring 137 to raise the knife 125.

To the table 98 is attached a notched vertical rod 138, to which rod is connected a spring 139, Fig. 40, which spring tends to hold said rod to the left of Fig. 40. When the table 98 rises, the rod 138 passes a stud 140 on an arm 141, projecting from a rock-shaft 142. To this shaft 142 are secured ejecting-arms 143 143. When the table 98 descends, the notch in rod 138 catches stud 140, and thereby causes arms 143 to swing rapidly over the top of the table 98, thereby throwing off from said table the folded, wrapped, and addressed paper thereon. As the rod 138 descends and the arm 141 turns about its pivot a stud 144 thereon encounters the rod 138 and moves said rod outward against the tension of the spring 139 until the stud 140 is released, when a spring 157 draws the arms 141 and 143 back to normal position.

In order to assort the addressed papers in lots according to the localities to which they are to be sent, the address-strip may be passed over a table 145, Figs. 21, 22, and 31, forming a part of the addresser, and in this table there may be insulated contact-plugs 146 and above them insulated contact-brushes 147, adapted to make contact therewith through perforations provided in the address-strip at intervals, as shown in Fig. 23.

To the left of the elevator-table 98, as shown in Fig. 21, there is a tilting deflector 148. (Shown also in Fig. 43.) An inclined apron 149 guides the papers ejected from said table 98 by the fingers 143 to this deflector 148. Deflector 148 is mounted upon a frame 150, to which suitable bags or receptacles may be secured, one on one side of the deflector and another on the opposite side. According as the deflector is tilted to one side or the other papers ejected from the table 98 will be deposited in the one bag or the other.

The deflector 148 is tilted by a mechanism shown diagrammatically in Fig. 22. To said deflector is secured an arm 151, connected by a link 152 to a pivoted armature-lever 153, mounted between the poles of two magnets 154 and 155. These magnets have separate circuits, the circuit of one magnet being connected to one brush 147 and a corresponding contact-piece 146, the circuit of the other magnet being connected to the other brush and contact-piece. By this means as the address-strip is fed on when one of the brushes 147 makes contact with its corresponding contact-plug the deflector 148 is tilted into its opposite position, and the papers thereafter ejected from the table 98 are deposited in a new receptacle, the receptacle already filled being then removed from the frame 150 and a new one put in its place.

In order to prevent paste from passing through the perforations in the address-strip, and so causing two papers to adhere, said perforations may be covered by strips of tin-foil or similar material 158, as shown in Fig. 24.

The operation of this machine is as follows: Papers to be folded, fed in between the feed-tapes 7 and 8 at times when the arms 5 are raised, are grasped by said tapes when said arms are being lowered and by the tapes are ried underneath the primary folding-knife 3.

At the same time a section of the wrapper-strip drawn from the roll 12 by the feed-rolls 13 and 14 and cut off by the cutting-rolls 15 and 16 is fed by the tapes 8 and 17 underneath the primary folding-knife 3 and underneath the paper to be folded. The cam 61, Fig. 10, then permits the clamping-arm 51 to descend and hold one edge of the wrapper. The next instant the primary folding-knife descends, folding the newspaper once and causing the wrapper to slip around such fold of the newspaper into the position shown by the broken heavy line in Fig. 10. The cam 61 then raises the clamping-arm 51 and at about the same time the secondary folding-knife 4 moves forward, folding the newspaper a second time and folding the wrapper once and pressing said newspaper, with the wrapper about it, through the spring-fingers 53 into one of the pockets in the carrier or basket 39. As soon as the folding-knife 4 has retreated said basket begins to revolve, and as it does so the spring-fingers 53, which still continue to grasp the projecting flap of the wrapper, as shown in Fig. 13, draw said wrapper tight and press it against one of the paste-pallets 42 of the basket 39.

The operations above described are repeated, successive papers and wrappers being fed forward, folded, and deposited in the successive pockets of the basket 39, which after receiving each paper rotates onward to bring a new pocket opposite the secondary folding-knife 4. While the basket thus rotates paste is applied to its pallets by the paste-belt 71, itself receiving paste from the belt 67. A spring-finger 156, Fig. 8, presses the projecting flap of the wrapper down upon the corresponding paste-pallet 42, and when the basket has rotated a little further the teeth 108 of the comb 102 descend upon the projecting flap of the wrapper and press it upon the paste-pallet 42. When one of the papers in the basket has reached the ejecting position, the basket remains for an instant in such position and the ejecting-fingers 74 move forward, the clamping-fingers 87 and 88 at the same time moving forward, grasping the paper and holding it tightly pressed. The teeth 108 draw the wrapper tight as the paper is ejected, and the teeth 106 press the pasted flap of the wrapper down upon the main portion thereof, as does the brush 101. The wheel 105 depresses the arm 104 and lifts the teeth 108 of the comb 102 away from the carrier before said teeth can come in contact with the paste-covered surface of the carrier, and so become covered with paste. By these operations the folding and wrapping of the newspapers are completed. The ejecting-fingers 74 and the ejecting clamping mechanism together carry the paper onward and deposit it upon the elevating-table 98. Said table is then raised by means of the plunger 113, and as it rises the folded paper upon it encounters the screw 134 on the end of the operating-arm 135 of the cutting mechanism of the addresser, causing said arm to operate the cutting-knife 125 and cause the same to descend, cutting off an address-label and pressing the same down upon the wrapped paper. The table 98 then descends and the ejecting-fingers 143 eject the folded, wrapped, and addressed paper from the table 98, causing it to fall upon the deflector 148, which guides it into one of the receptacles or bags on the frame 150.

In the preceding general description I have omitted the description of certain specific devices and mechanisms by which the portions of the machine are adjusted or their operation automatically controlled. These devices and mechanisms I will now describe.

It is frequently the case that the wrappers are addressed before being placed in the machine instead of by an addressing mechanism, such as is shown in Fig. 20 and the figures following. This is done by printing the several addresses at proper intervals on the wrapper-web 12 as it is wound upon the mandrel, by which it is carried when placed in this machine, and it is often the case that a portion of an edition of a newspaper must be wrapped with wrappers already addressed, as just described, the remainder of the edition being addressed after wrapping by an addressing mechanism, such as shown in Fig. 20 and the figures following. It is therefore necessary both to provide this machine with an addressing mechanism and also to provide it with a mechanism for adjusting from time to time the point at which the wrappers are cut, so that if the machine be operating with wrappers already addressed each section of the wrapper-web may be cut off at such point that the address thereon will be properly exposed when the wrapping of the paper is completed. The mechanism for regulating the cutting of the wrappers from their web is shown in Figs. 2 to 7, inclusive, and embodies two escapement mechanisms by means of which the feeding of the wrapper may be arrested momentarily or the rotation of the cutting-rolls arrested momentarily, according as it is desired to move the point of cutting forward or backward on the wrapper-strip with reference to the positions of the addresses thereon.

Referring now to Figs. 2 to 7, inclusive, the shaft 10 is driven by means of a sprocket-chain 161 and suitable gearing from the main driving-shaft 37 of the machine, (the gearing by which chain 161 is driven being shown in Figs. 1 and 9.) Upon the shaft 10 is a gear 162, (shown in dotted lines in Fig. 2,) intermeshing with an intermediate gear 163, (also shown in dotted lines in Fig. 2,) which latter gear intermeshes with gear 164, which is on and keyed to the shaft 165 of the lower cutting-roll 15. Gears 162, 163, and 164 are on the side of the machine shown in Fig. 1; but gears 162 and 163 are hidden in that figure by a large gear on shaft 10. Upon the shaft 166 of the upper feed-roll 14 is a gear 167, intermeshing with gear 164 on the shaft of the lower cutting-roll. Roll 14 is not keyed to this shaft, but is provided with a ratchet or escapement wheel 168, Fig. 6, and also with a spur-gear 169, intermeshing with a corresponding spur-gear 170, which drives the lower feed-roll 13. To shaft 166 is keyed an arm 171, carrying an escapement 172, provided with a projecting finger 173. Upon the projecting end of the shaft 166 is a sliding handle 174, which at its inner end is cone-shaped. This handle 174 is provided with a pin 175, which prevents it from slipping off the end of the shaft 166. The parts being in the position shown in Figs. 3 to 7, if the handle 174 be pressed inward the cone-shaped inner face thereof will encounter the finger 173 of the escapement 172 and will raise said finger, thus moving the escapement about its pivot. The distance between the two teeth of the escapement is such that at each actuation of the finger 173 a lost motion of the escapement-wheel 168 is permitted which equals one-half the pitch of a tooth of said wheel. The roll 14 is driven from its shaft 166 through the escapement, and therefore the effect of pressing in the bushing 174 in this manner is to cause the roll 16 to drop back with reference to its shaft a half-tooth. When the handle 174 is pulled out again, the escapement 172 is again operated by means of a spring 176, again causing the roll 14 to drop back with reference to its shaft through the space of a half-tooth. It will be seen, therefore, that by working the handle 174 backward and forward the feeding of the wrapper may be delayed as much as desired. It will be noted that during the operation of this escapement mechanism the operation of the cutting-rolls 15 and 16 is not affected. The two cutting-rolls 15 and 16 are driven through an exactly similar escapement mechanism mounted upon the shaft 165 of roller 15. By operating this latter escapement mechanism the rotation of the cutting-rolls may be delayed temporarily without affecting the rate of feeding of the wrapper-strip. Delaying the rotation of the cutting-rolls has the same effect in so far as the adjustment of the position of the cut is concerned as accelerating the speed of the feeding-rolls 13 and 14 would have. A similar mechanism (shown particularly in Figs. 35 and 36) is employed for adjusting the feeding of the address-strip in the addressing device shown in Fig. 20 and the figures following. The feed-roller 122 and the gear-wheel 177, attached to it and which intermeshes with a similar gear-wheel 178, attached to roller 121, are not keyed to the shaft 180, upon which the roller 122 is mounted, but are driven therefrom through an escapement mechanism constructed as follows: Upon the shaft 180 is keyed an arm 181, carrying a ratchet-pawl 182, adapted to engage the teeth of a ratchet-wheel 183, mounted on shaft 180. This ratchet-wheel has an elongated hub 184, which at the end is slotted and fits into a slot 185 in the end of roll 122. Therefore when said ratchet-wheel is rotated the roll 122 and the companion roll 121 are rotated. Upon shaft 180 is loosely mounted another arm 186, carrying a ratchet-pawl 187, likewise arranged to engage the teeth of the wheel 183, and when one of these two pawls is in driving engagement with the teeth of the ratchet-wheel the other pawl is out of driving engagement with the teeth of said wheel by the space of a half-tooth. In Fig. 35 pawl 187 is shown in engagement. If said pawl be raised while shaft 180 is rotating, the feed-rollers will cease to revolve momentarily and until pawl 182 has engaged one of the teeth of the ratchet-wheel and will then move onward. By raising pawl 182 in turn the feed-rollers 121 and 122 may be caused again to drop backward through the space of a half-tooth. Arms 181 and 186 are connected by a pin 188, working in a slot in arm 181, and said arm 186 is also provided with a handle 189. By moving said handle in the direction of the arrow shown in Fig. 35 and then backward again the feed-rollers 121 and 122 may be caused to advance with respect to shaft 180. It will thus be seen that by operating either the handle 189 or the pawls 182 and 187 the address-strip may be moved backward or forward with reference to the point of cut at will. Rolls 124 are driven with a peripheral velocity somewhat greater than the normal rate of feeding of the strip and normally slip slightly. They are thus able to take up the slack in the strip when the handle 189 is operated, as above described. The effect of such operation of the pawls 182 and 187 or of the handle 189 may be seen by reference to Figs. 37 and 38. Fig. 37 represents the condition when the address-strip has been fed too far underneath the cutting-knife 125, so that the cut is too near the address. By raising either pawl 187 or 182, according to whichever pawl is in engagement, the feeding-rolls and the address-strip may be caused to drop back a half-tooth with reference to shaft 180, so that when the knife 125 next descends the advanced section of the address-strip will have been fed forward only as far as indicated in Fig. 38.

It is very important that, in case the feeding to the folding and wrapping mechanism of papers to be folded and wrapped is interrupted at any time, the operation of the machine shall cease immediately. To accomplish this, I employ a stop-motion mechanism. (Shown in Figs. 14, 15, 17, 18, and 19.) This mechanism is located directly beneath the tapes by which the papers are fed underneath the primary folding-knife 3. 190 is a detector-finger of this stop mechanism, revolubly mounted upon one of the rollers 24 and projecting beneath the folding-blade 3. To the left of the rollers 24 is a shaft 191, upon which is a finger 192, through an aperture in which passes a rod 193, connected to finger 190, as shown in Figs. 18 and 19. Upon this rod 193 is a collar 194. Upon shaft 191 is an arm 195, connected by a link 196 to a bell-crank 197, pivoted to a latch-arm 198. The lower arm 199 of bell-crank 197 is adapted to engage a pin 200, projecting from the bell-crank 19, which forms a part of the mechanism which operates the primary folding-knife 3. A belt-shifting rod 201, Figs. 1, 8, 9, 14, 15, and 17, is mounted in suitable bearings in the frame of the machine and is arranged to slide in a direction parallel to the main driving-shaft 37. A spring 202 tends to press this shifting-rod to the left of Figs. 9 and 15; but normally such motion is prevented by the latch-arm 198, which engages a notch in the rod 201. If a paper is fed by the tapes 7 and 8 underneath the folding-knife 3 in a proper manner before said folding-knife descends, then as such knife descends the paper under it will encounter the finger 190 and will depress the same before the pin 200 has reached the arm 199 of the bell-crank 197, thereby moving said arm 199 out of the path of the pin 200 and into the position shown in dotted lines in Fig. 14; but if by any chance a paper shall not be fed underneath the folding-knife 3 before the said knife begins to descend then the finger 190 will not be depressed, but will enter a slot 203, Fig. 1, in the folding-knife, and the pin 200 will encounter the arm 199 of bell-crank lever 197 and will lift the same and also the latch-arm 198, thereby releasing the belt-shifting rod 201 and permitting the spring 202 to force said rod to the left of Figs. 9 and 15, thereby shifting the driving-belt from the tight pulley 204, Fig. 1, to the loose pulley 205, and so stopping the machine. To start the machine again, a handle 206, Figs. 9 and 14, is moved to the right of Fig. 9. This handle is connected to a rock-shaft 207, to which rock-shaft is also connected an arm 208, connected to the belt-shifting rod 201. By moving the handle 206 in the manner described the rod 201 is drawn backward against the tension of the spring 202 until a notch in such rod is opposite the latch-arm 198, when said arm 198 is raised by a spring 209, thereby locking the belt-shifting rod. The latch-arm 198 is provided with a handle by which it may be lifted by hand, so that this stop-motion mechanism may be employed to stop the machine by hand, as well as automatically. A spring 210 serves to hold the bell-crank 197 normally in the position shown in Fig. 14 and to hold the detector-finger 190 normally in a horizontal position. Such spring also serves to return such parts to their normal positions after they have been operating. It is also important that in case a paper shall have been fed under the folding-knife too far to one side or to the other the machine shall be stopped before such paper can become jammed in the machine. For this purpose I employ two detector-fingers 211 upon opposite sides of the folding-knife 3. These fingers are in construction similar to finger 190 and are connected to operating-rods 212 in a similar manner. Such operating-rods actuate a bracket 213, mounted upon the shaft 191 and having an arm 214, connected by a link 215 to a bell-crank lever 216, located near the bell-crank lever 197, above mentioned. The bell-crank 216 is normally out of the path of the pin 200, whereas bell-crank 197 is normally in the path of said pin. The detector-fingers 211 will not be actuated when the paper is fed into the proper position beneath the folding-knife 3; but if said paper be fed too far to one side or the other one of the detector-fingers 211 will be depressed by said paper when folded by the folding-knife 3 and will move the bell-crank 216 into position over the pin 200, and when such pin strikes the bell-crank 216 it will raise the latch-arm 198, thereby releasing the belt-shifter 201, and so will stop the mechanism. I also employ, in connection with the addresser, a stop-motion device to prevent the operation of the addresser in case at any time when the elevating-table 98 rises there is no paper thereon to be addressed. The lower gear 128, through which the feed-rolls of the addresser are driven, is mounted upon a movable hanger 220, pivoted to the frame of the machine, and to said hanger 220 is pivoted an arm 221, carrying an upright pivoted detector-finger 222, located over the table 98. A spring 223 (shown in dotted lines in Figs. 40 and 41) tends to press said finger 222 forward, and a spring 224, connecting hanger 220 and arm 221, tends to hold said arm and hanger in line. The finger 222 is provided at its upper end with a hook which normally engages a stationary bar 225, forming a portion of the frame of the machine. This bar holds the finger 222 in such position that the two gears 128 128 are in mesh. When the table 98, with a paper thereon, rises near the end of its travel, the finger 222 is lifted a short distance, the spring 224 permitting the necessary movement of arm 221. In the table 98 and directly beneath the finger 222 is a slot 226. If for any reason no folded paper is placed upon the table 98 before said table rises, the finger 222 will pass through said slot 226 and will not be lifted, and the end of slot 226, encountering the beveled surface 227 of finger 222, will tilt said finger so as to move it out of engagement with support 225, thereby permitting arms 221 and 220 to drop, thus disengaging the two gears 128 128. A stop-pin 228 is encountered by arm 220, and thus the motion of said arm is limited. As the table 98 in its descent moves away from finger 222 the spring 223 presses said finger forward into an upright position, so that when the table 98 next rises with a paper thereon said finger will be lifted into engagement with the support 225, thereby bringing the gears 128 128 into engagement again. It will be noted, therefore, that in case the table 98 rises without a paper thereon neither the address-strip-feeding device of the addresser nor the cutting-knife 125 is operated, the finger 222 and the screw 134 both passing through slots in said table.

The main paste-belts 67 and 71 are provided with scrapers 230, by which excess of paste is scraped from them. The rollers 72 and 73, carrying belt 71, are mounted upon spindles 231, which, as indicated in dotted lines in Fig. 8, have eccentric journals and may be secured in any desired position by set-screws. By adjusting the positions of these spindles the tension of belt 71 and the distance between rollers 69 and 72 may be adjusted as desired.

One of the rollers 26, between which the paper is passed by the first folding-knife 3, is provided with a handle 232. (Indicated in dotted lines in Fig. 8.) By means of this handle the spring-fingers carried by said roller may be swung back, so as to facilitate the withdrawal of a paper from in front of the second folding-knife.

The lower of the two feed-rollers 124 at the front of the addresser is grooved, so that it shall not press too much paste away from the address-strip.

Having thus completely described my invention, what I claim, and desire to secure by Letters Patent, is—

1. In a machine for folding and wrapping newspapers and the like, the combination, with folding mechanism adapted to receive an article to be folded and a wrapper therefor, of means for holding one portion of the wrapper while the newspaper or other article is being folded, whereby the wrapper is not inserted into a fold of the article folded, but may be wrapped about said article.

2. In a machine for folding and wrapping newspapers and the like, the combination, with folding mechanism adapted to receive an article to be folded and a wrapper therefor, and having two folding devices acting substantially at right angles, of means for holding one end of the wrapper while the first folding device is operating, whereby the wrapper is drawn into position to be acted upon by the second folding device, and is folded about the newspaper or other article thereby, but is not inserted into the fold of the article to be wrapped formed by said second folding device.

3. In a machine for folding and wrapping newspapers and the like, the combination, with folding mechanism adapted to receive an article to be folded and a wrapper therefor, of an automatically-operated clamp for holding one portion of the wrapper while the newspaper or other article is being folded, whereby the wrapper is not inserted into a fold of the article folded, but it may be wrapped about said article.

4. In a machine for folding and wrapping newspapers and like, the combination, with folding mechanism adapted to receive an article to be folded and a wrapper therefor, and having two folding devices acting substantially at right angles, of an automatically-operated clamp for holding one end of the wrapper while the first folding device is operating whereby the wrapper is drawn into position to be acted upon by the second folding device, and is folded about the newspaper or other article thereby, but is not inserted into the fold of the article to be wrapped formed by the second folding device.

5. In a machine for folding and wrapping newspapers and the like, the combination, with folding mechanism adapted to receive an article to be folded and a wrapper therefor, and having two folding-knives acting substantially at right angles, of a carrier having pockets adapted to receive the folded papers and wrappers from the second folding-knife, and an automatically-operated clamp arranged to hold that end of the wrapper which is most distant from the second folding-knife, during the action of the first folding-knife, whereby the wrapper is not folded about the paper by the first folding-knife but is drawn into position to be wrapped about such paper by the action of the secondary folding-knife.

6. In a machine for folding and wrapping newspapers and the like, the combination, with folding mechanism adapted to receive an article to be folded and a wrapper therefor, and having two folding-knives acting substantially at right angles, of a carrier having a pocket adapted to receive the papers and wrappers from the second folding-knife, a clamping-arm adapted to hold that end of the wrapper which is most distant from the second folding-knife, during the action of the first folding-knife, means for pressing said clamping-arm against the paper, and a cam and means operated thereby for lifting said arm at intervals.

7. In a machine for folding and wrapping newspapers and the like, the combination, with folding mechanism adapted to receive an article to be folded and a wrapper therefor, and to deposit the folded papers and wrappers in the pockets of a carrier, of a carrier having such pockets, and spring-fingers between which the papers and wrappers must pass on their way to the carrier, said fingers being adapted to grasp the wrapper and draw the same taut as the carrier moves on.

8. In a folding and wrapping machine, the combination, with a carrier having pockets adapted to receive folded and wrapped newspapers and other objects, of spring-fingers between which such objects pass, adapted to grasp the wrapper and draw the same taut.

9. In a folding and wrapping machine, the combination, with a carrier having pockets adapted to receive folded and wrapped papers and other articles, of fingers between which such articles must pass, adapted to grasp and draw taut the wrappers, said fingers being mounted upon supports the distance between which may be varied automatically and at will.

10. In a machine for folding newspapers and the like, the combination, with a movable folding device, of a stop-motion mechanism, and a detector device for controlling the stop-motion mechanism, and adapted to be actuated by the misplacement of an article passing through said folding device.

11. In a machine for folding and wrapping newspapers and the like, the combination, with a movable folding device, of a detector-finger arranged to be displaced by an article which is being folded by said device and which is not in proper position, and means, operated by said finger when so displaced, for stopping the operation of the machine.

12. In a machine for folding newspapers and the like, the combination, with a movable folding device, of a detector-finger, located in the path thereof, but arranged to be displaced only when an article to be folded precedes such folding device, a second detector-finger arranged to be displaced by an article which is being folded by said folding device and which is not in proper position, and means, operated by said fingers, for stopping the machine, if the first detector-finger is not displaced as the folding device operates, and for stopping the machine when the second detector-finger is displaced.

13. In a machine for folding newspapers and the like, the combination, with a movable folding-knife, of a detector-finger pivotally mounted and located opposite a slot in said knife, other detector-fingers, pivotally mounted upon opposite sides of said folding-knife, and two concentrically-pivoted members, one connected to the first detector-finger and the other to the other detector-fingers, and connected to stop-motion mechanism.

14. In a machine for folding newspapers and the like, the combination, with a carrier having pockets adapted to receive the folded articles, of a vibrating carriage having clamping members adapted to press the folds of said articles together while they are being removed from the carrier, and means for operating said clamping members and for vibrating said carriage.

15. In a machine for folding newspapers and the like, the combination, with a movably-mounted carriage, and means for vibrating the same, of clamping members carried by said carriage and arranged to receive between them a folded article, and means for operating such clamping members.

16. In a machine for folding newspapers and the like, the combination, with a movably-mounted carriage, and means for vibrating the same, of two pivoted clamping members carried thereby, arranged to receive between them a folded article, and provided with extensions adapted to coact with an actuating member by which said clamping members may be pressed together, an actuating member, mechanism for operating the same so as to close the clamp at intervals, a latch for holding the clamp closed, and means for releasing the latch and permitting the clamp to open.

17. In a machine for folding newspapers and the like, the combination, with a two-part carrier having pockets adapted to receive the folded articles, of a clamping mechanism working in the space between the parts of said carrier, and arranged to grasp papers in the pockets thereof and press their folds together while they are being removed from the carrier.

18. In a machine for folding newspapers and the like, the combination, with a two-part revoluble carrier having pockets for the folded articles, of ejecting-fingers for removing such articles from the pockets, and a vibrating clamp mechanism, working between the parts of the carrier, and adapted to grasp the folded articles successively and press their folds together while they are being removed from the carrier.

19. In a machine for folding newspapers and the like, the combination, with a two-part carrier having pockets for the folded articles and peripheral paste-distributers, of means for applying paste thereto, a vibrating clamp mechanism, working between the parts of the carrier, and having clamping-fingers adapted to grasp the folded articles successively and press their folds together, while they are being removed from the carrier, and means for applying paste to the upper clamping-finger.

20. In a machine for folding newspapers and the like, the combination, with a movable table, means for operating the same, and means for delivering articles thereto, of an ejecting mechanism having fingers arranged to move across said table and thereby to remove articles therefrom, and an actuating device secured to said table, and arranged to operate the table on the return movement of the table.

21. In a machine for folding newspapers and the like, the combination, with a movable table, and mechanism for delivering articles thereto, of ejecting-fingers for removing articles from such table, comprising pivoted and spring-retracted fingers, a rocker-arm connected therewith, and an operating-rod secured to said table and having a notch adapted to engage a projection on the rocker-arm of such ejecting mechanism, on the return motion of the table, means for drawing the said notched rod toward the projection on said rocker-arm, and means, carried by the rocker-arm, for disengaging said notched rod, when the ejecting-fingers have passed from the table.

22. In a machine for wrapping newspapers and the like, the combination, with wrapping mechanism, of web feeding and cutting mechanism, comprising separate feeding and cutting devices, and an escapement mechanism whereby the operation of the feeding devices may be delayed with respect to the operation of the cutting devices for the purpose of adjusting the point at which the web is cut.

23. In a machine for wrapping newspapers and the like, the combination, with wrapping mechanism, of web feeding and cutting mechanism, comprising separate feeding and cutting devices, and an escapement mechanism whereby the operation of the cutting devices may be delayed with respect to the operation of the feeding devices, for the purpose of adjusting the point at which the web is cut.

24. In a machine for wrapping newspapers and the like, the combination, with wrapping mechanism, of web feeding and cutting mechanism comprising separate feeding and cutting devices, one of said devices having a shaft, a roll mounted loosely on said shaft, a ratchet-wheel and double escapement-pawl, one carried by the shaft and the other by the roll mounted on said shaft, and means for bringing first one side and then the other side of the escapement-pawl into action, at will.

25. In a machine for wrapping newspapers and the like, the combination, with wrapping mechanism, of web feeding and cutting mechanism comprising separate feeding and cutting devices, one of said devices having a shaft, a roll mounted loosely on said shaft, a ratchet-wheel and double escapement-pawl, one carried by the shaft and the other by the roll mounted on said shaft, and a cone bushing mounted concentrically with the shaft and adapted to engage a projection of the escapement-pawl, whereby by moving the bushing in or out the pawl may be moved, and a spring for the pawl.

26. In a machine for wrapping newspapers and the like, the combination, with wrapping mechanism, of two coacting web-feeding rolls, two coacting web-cutting rolls, one of each of said pairs of rolls being mounted loosely on a shaft and being provided with a gear intermeshing with a corresponding gear by which its companion roll is driven, hand-operated escapement mechanism serving to connect each of such shafts with the roll upon it, and adapted, when operated, to cause such roll to move relatively to its shaft, and gearing for communicating motion to said shafts.

27. In a machine for folding newspapers and the like, the combination, with folding mechanism, of web feeding and cutting mechanism, and means for moving the web forward or backward with reference to the cutters, from time to time, independent of the rate of automatic feeding of the web by the feeding mechanism, for the purpose of adjusting the point at which the web is cut.

28. In a machine for folding newspapers, and the like, the combination, with folding mechanism, of web feeding and cutting mechanism, and hand-operated escapement mechanism for adjusting the point at which the web is cut.

29. In a machine for folding newspapers and the like, the combination, with feeding mechanism, of cutting devices, web-feeding devices, and hand-operated escapement mechanism through which the web-feeding devices are driven, by which the point at which the web is cut may be adjusted.

30. In a machine for folding newspapers and the like, the combination, with folding mechanism, of cutting devices, web-feeding devices, and escapement mechanism through which the web-feeding devices are driven, containing a ratchet-wheel, escapement-pawls, and means for bringing said pawls into action alternately.

31. In a machine for folding and wrapping newspapers and the like, the combination, with a carrier having pockets adapted to receive folded newspapers and other objects, with wrappers about the same, each wrapper having an outwardly-projecting flap, said carrier having also paste-distributing surfaces adapted to apply paste to such projecting flaps of the wrappers, of movable fingers for pressing said flaps down upon said surfaces, and means for moving said fingers away from such surfaces before the wrappers have passed said fingers.

32. In a machine for folding and wrapping newspapers and the like, the combination, with a carrier having pockets adapted to receive folded newspapers and the like, and having also paste-distributing surfaces, of a paste-reservoir, a paste-carrier for removing paste therefrom, a second paste-carrier for transferring paste from the first carrier to the distributing-surfaces, and means for adjusting the distance between said paste-carriers.

In testimony whereof I affix my signature in the presence of two witnesses.

LEE A. AGNEW.

Witnesses:
E. H. TUCKER,
H. M. MARBLE.